US010687376B2

(12) United States Patent
Pan et al.

(10) Patent No.: US 10,687,376 B2
(45) Date of Patent: Jun. 16, 2020

(54) METHOD AND APPARATUS FOR IMPROVING INITIALIZATION OF SIDELINK DUPLICATION RECEPTION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/561,864

(22) Filed: Sep. 5, 2019

(65) Prior Publication Data

US 2020/0084659 A1 Mar. 12, 2020

Related U.S. Application Data

(60) Provisional application No. 62/729,148, filed on Sep. 10, 2018.

(51) Int. Cl.
*H04W 76/14* (2018.01)
*H04W 28/06* (2009.01)
(Continued)

(52) U.S. Cl.
CPC ........... *H04W 76/14* (2018.02); *H04W 76/15* (2018.02); *H04L 1/1841* (2013.01); *H04W 28/065* (2013.01); *H04W 92/18* (2013.01)

(58) Field of Classification Search
CPC ...... H04W 76/14; H04W 88/04; H04W 92/18
See application file for complete search history.

(56) References Cited

U.S. PATENT DOCUMENTS

2015/0215825 A1* 7/2015 Kim ................. H04W 36/0088
370/331
2015/0305012 A1* 10/2015 Yi ......................... H04W 76/14
370/329
(Continued)

OTHER PUBLICATIONS

CATT: "Introduction of V2X duplication to TS 36.323", 3GPP Draft; R2-1809292, 3rd Generation Partnership Project (3GPP), Mobile Competence Centre ; 650, Route Des Lucioles ; F-06921 Sophia-Antipolis Cedex ;France vol. RAN WG2, no* Busan, Korea; 20180521-20180525 Jun. 7, 2018 (Jun. 7, 2018), XP051520616.
(Continued)

*Primary Examiner* — Marcus Smith
(74) *Attorney, Agent, or Firm* — Blue Capital Law Firm, P.C.

(57) ABSTRACT

Methods and apparatuses for improving initialization of sidelink duplication reception in a wireless communication system are disclosed herein. In one method, a User Equipment (UE) receives a first Packet Data Convergence Protocol (PDCP) Protocol Data Unit (PDU) on a logical channel associated with a sidelink radio bearer (SLRB). The UE initializes a first state variable based on a partial Reordering_Window and a PDCP Sequence Number (SN) of the first received PDCP PDU, wherein the first state variable indicates the PDCP SN of a last PDCP Service Data Unit (SDU) delivered to the upper layers by a PDCP entity created for the SLRB, and the partial Reordering_Window is less than a Reordering_Window. The UE performs a re-ordering procedure for the first PDCP PDU using the initialized first state variable.

20 Claims, 10 Drawing Sheets

(51) Int. Cl.
*H04W 76/15* (2018.01)
*H04W 92/18* (2009.01)
*H04L 1/18* (2006.01)

(56) References Cited

U.S. PATENT DOCUMENTS

| | | | | |
|---|---|---|---|---|
| 2017/0181185 | A1* | 6/2017 | Lee | H04W 72/1289 |
| 2017/0188344 | A1 | 6/2017 | Yi et al. | |
| 2019/0208541 | A1* | 7/2019 | Lee | H04W 72/0446 |
| 2019/0239112 | A1* | 8/2019 | Rao | H04W 28/0268 |
| 2019/0288770 | A1* | 9/2019 | Martin | H04L 1/1896 |
| 2019/0289489 | A1* | 9/2019 | Yi | H04W 28/0205 |
| 2019/0297610 | A1* | 9/2019 | Yi | H04W 76/27 |
| 2019/0373672 | A1* | 12/2019 | Kim | H04W 80/08 |

OTHER PUBLICATIONS

OPPO: "Left issues on PDCP operation for duplication", 3GPP Draft; R2-1812937—Left Issues on PDCP Operation for Duplication, 3rd Generation Partnership Project (3GPP), Mobile Competence Centre ; 650, Route Des Lucioles : F-06921 Sophia-Antipolis Cedex vol. RAN WG2, no. Gothenburg, Sweden; 20180820-20180824 Aug. 14, 2018 (Aug. 14, 2018), XP051522521.
VIVO: "Packet duplication detection in sidelink PDCP" 3GPP Draft; R2-1804697 Packet Duplication Detection in Sidelink PDCP, 3rd Generation Partnership Project (3GPP), Mobile Competence Centre ; 650, Route Des Lucioles : F-06921 Sophia-Antipolis Cedex vol. RAN WG2, no. Sanya, China; 20180416-20180420 Apr. 14, 2018 (Apr. 14, 2018), XP051428411.
European Search Report in corresponding EP Application No. 19195569.9, dated Dec. 11, 2019.

\* cited by examiner

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

FIG. 6

| Index | Size of Length field (in bits) |
|---|---|
| 0 | 7 |
| 1 | 15 |

METHOD AND APPARATUS FOR IMPROVING INITIALIZATION OF SIDELINK DUPLICATION RECEPTION IN A WIRELESS COMMUNICATION SYSTEM

CROSS-REFERENCE TO RELATED APPLICATIONS

The present application claims the benefit of U.S. Provisional Patent Application Ser. No. 62/729,148 filed on Sep. 10, 2018, the entire disclosures of which is incorporated herein in its entirety by reference.

FIELD

This disclosure generally relates to wireless communication networks, and more particularly, to a method and apparatus for improving initialization of sidelink duplication reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In one method, a User Equipment (UE) receives a first Packet Data Convergence Protocol (PDCP) Protocol Data Unit (PDU) on a logical channel associated with a sidelink radio bearer (SLRB). The UE initializes a first state variable based on a partial Reordering_Window and a PDCP Sequence Number (SN) of the first received PDCP PDU, wherein the first state variable indicates the PDCP SN of a last PDCP Service Data Unit (SDU) delivered to the upper layers by a PDCP entity created for the SLRB, and the partial Reordering_Window is less than a Reordering_Window. The UE performs a re-ordering procedure for the first PDCP PDU using the first state variable.

BRIEF DESCRIPTION OF THE DRAWINGS

FIG. 6 is a reproduction of Table 6.2.4-1 listing Values of LCID for SL-SCH taken from 3GPP TS36.321 v15.2.0.

FIG. 7 is a reproduction of Table 6.2.4-2 listing Values of F field from 3GPP TS36.321 v15.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS36.300 v15.2.0, Evolved Universal Terrestrial Radio Access (E-UTRA), Overall description, Stage 2; TS36.321 v15.2.0, Evolved Universal Terrestrial Radio Access (E-UTRA), Medium Access Control (MAC) protocol specification; TS36.323 v15.0.0, Evolved Universal Terrestrial Radio Access (E-UTRA); Packet Data Convergence Protocol (PDCP) specification; and R2-1812809, LG, "Handling of the first received PDCP PDU located outside of the reordering window." The standards and documents listed above are hereby expressly incorporated by reference in their entirety.

Figure 1:
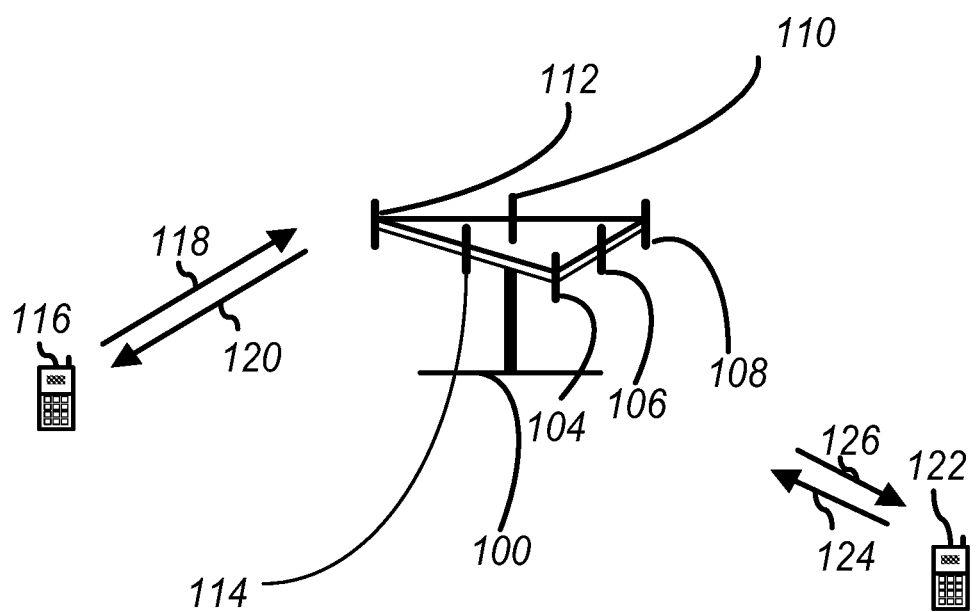
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
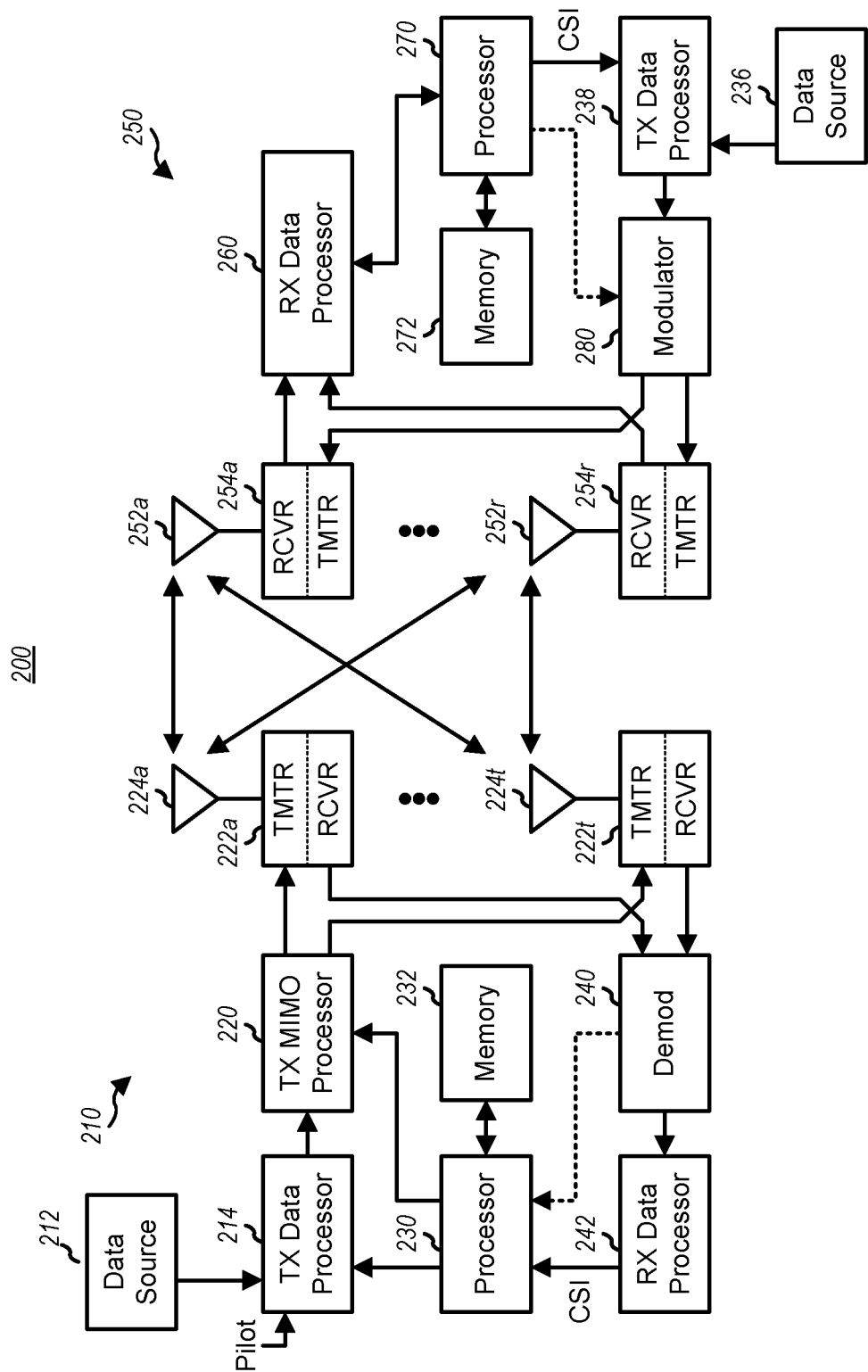
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
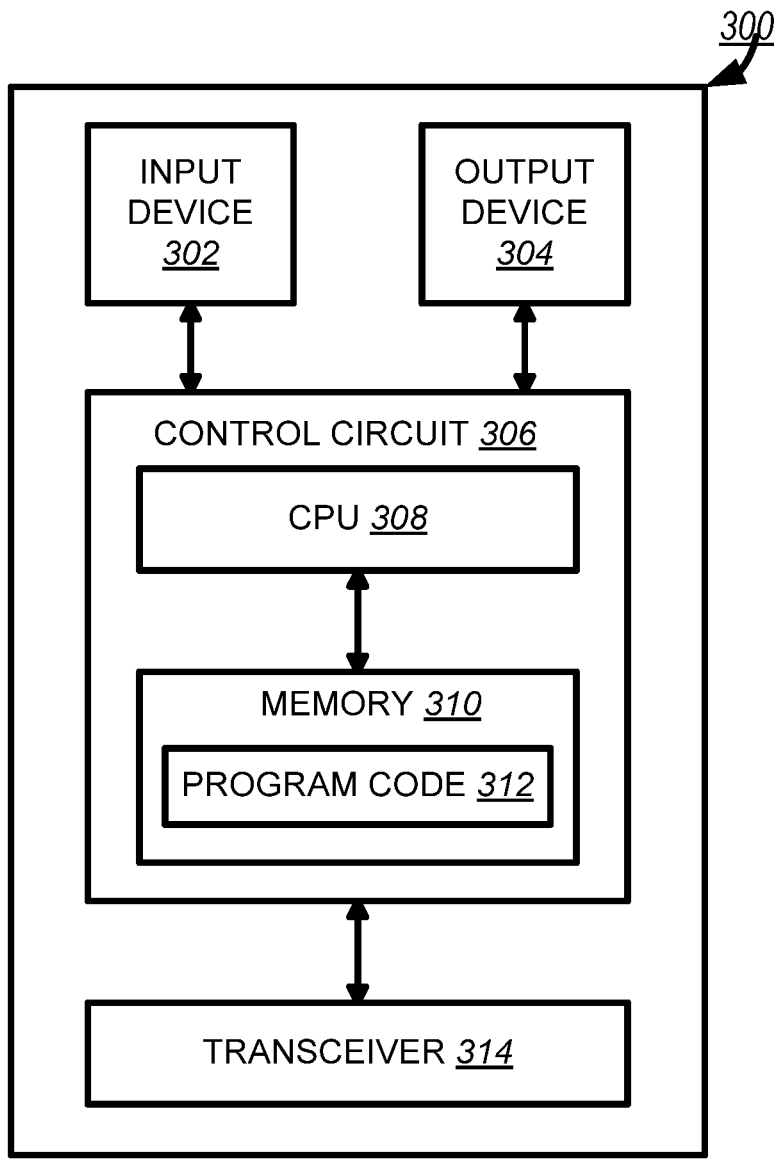
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
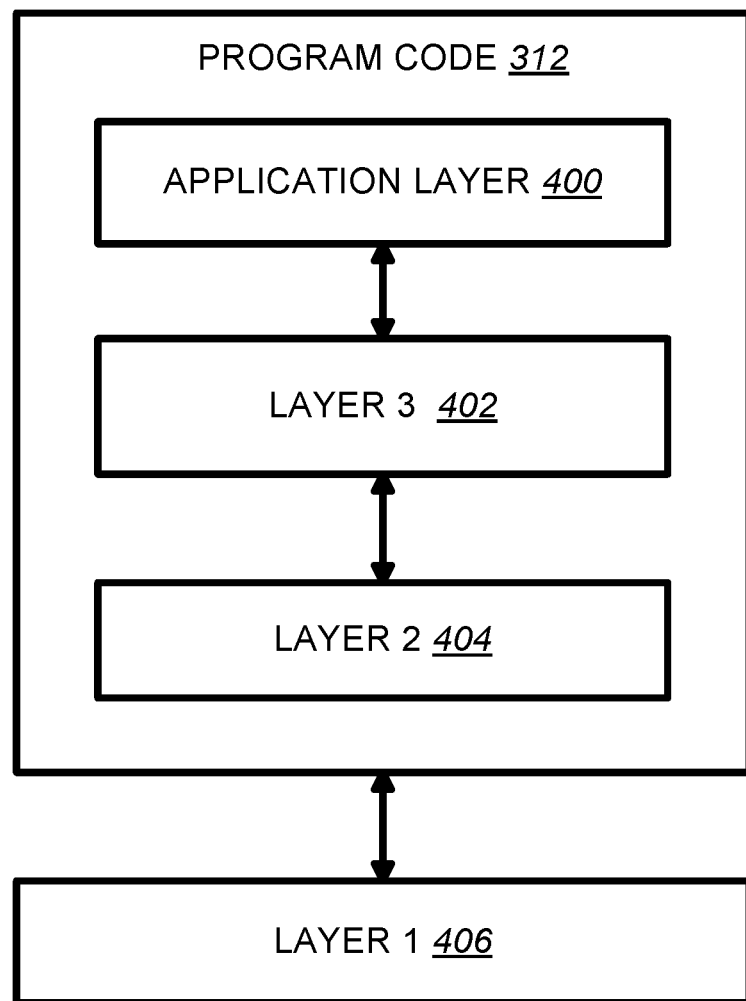
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.300 v15.2.0 discloses the following:
6.4 Carrier Aggregation
In case of CA, the multi-carrier nature of the physical layer is only exposed to the MAC layer for which one HARQ entity is required per serving cell;

In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell;

HARQ operation is asynchronous for Licensed-Assisted Access (LAA) SCells.

. . .

FIG. 6.4-1: Layer 2 Structure for DL with CA configured

. . .

FIG. 6.4-2: Layer 2 Structure for UL with CA configured

In case of CA in sidelink, which applies to V2X sidelink communication, there is one independent HARQ entity per carrier used for V2X sidelink communication and one transport block is generated per TTI per carrier. Each transport block and its potential HARQ retransmissions are mapped to a single carrier.

Figure 5:
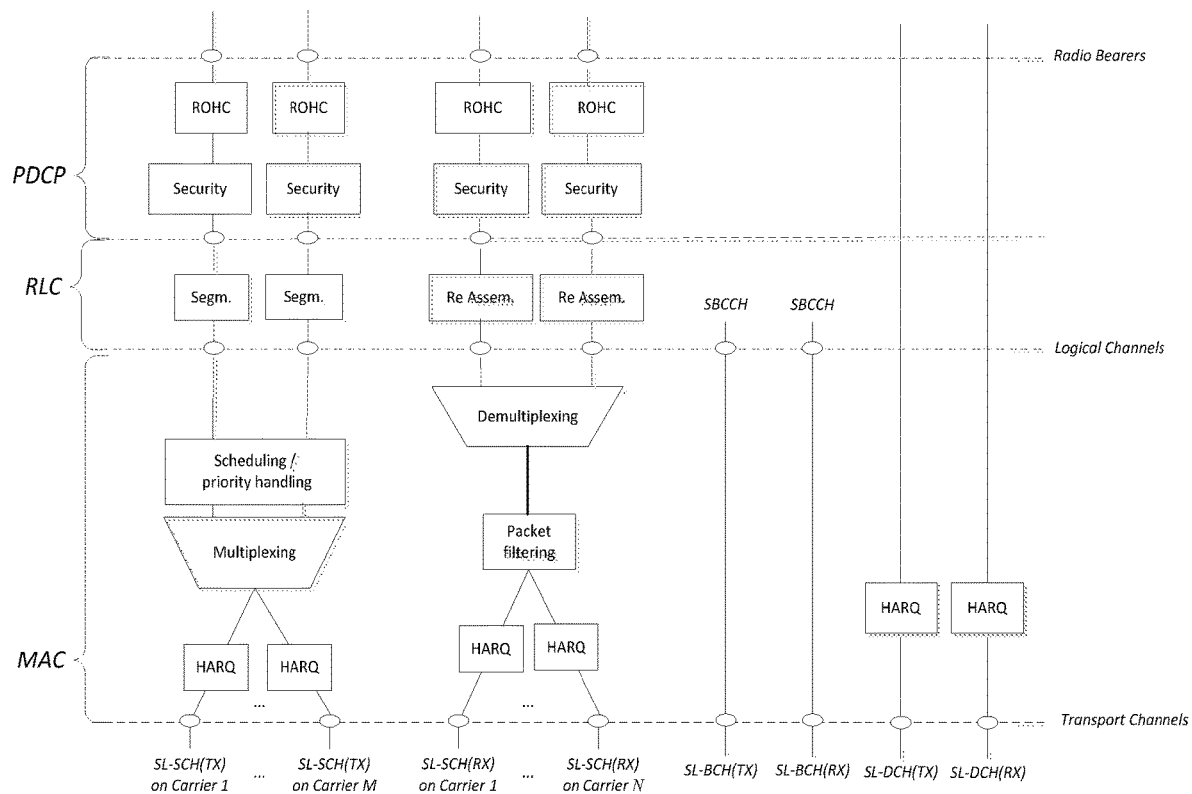
FIG. 5 is a reproduction of FIG. 6.4-x showing Layer 2 Structure for Sidelink with CA configured taken from 3GPP TS36.300 v15.2.0.

FIG. 5 (a reproduction of FIG. 6.4-x: Layer 2 Structure for Sidelink with CA configured)

. . .

23.14.1.1 Support for V2X sidelink communication

The user plane protocol stack and functions, as specified in subclause 23.10.2.1 for sidelink communication, are also used for V2X sidelink communication. In addition, for V2X sidelink communication:

STCH for sidelink communication is also used for V2X sidelink communication.

Non-V2X (e.g. Public Safety) data is not multiplexed with V2X data transmitted in resources configured for V2X sidelink communication.

The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value [72].

The Access Stratum (AS) is provided with a transmit profile [72] of a protocol data unit transmitted over PC5 interface by upper layers.

The logical channel prioritization based on PPPP is used for V2X sidelink communication.

. . .

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

. . .

Carrier aggregation (CA) in sidelink is supported for V2X sidelink communication. It applies to both in coverage UEs and out of coverage UEs. For CA in sidelink, neither primary component carrier nor secondary component carriers are defined. Each resource pool (pre)configured for V2X sidelink communication transmission or reception is associated to a single carrier. When a UE supporting CA in sidelink uses autonomous resource selection, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. For a UE using autonomous resource selection, logical channel prioritization is performed for a sidelink resource on a carrier depending on the CBR measured on the carrier and the PPPP of the sidelink logical channels as specified in 3GPP TS 36.321 [13].

Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre) configuration. The PPPR value(s) for which sidelink packet duplication is supported can be (pre)configured via a PPPR threshold. For UE autonomous resource selection and scheduled resource allocation, the UE shall perform sidelink packet duplication for the data with the configured PPPR value(s) until packet duplication is deconfigured for these PPPR value(s). For scheduled resource allocation, the UE reports the amount of data associated with one or more PPPR values, and the destination(s) to which the data belongs via sidelink BSR(s). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE.

For a UE using scheduled resource allocation, two non-overlapped sets of carriers are configured by the eNB per Destination reported by the UE to the network, and they apply to all the PPPR(s) that are configured for sidelink packet duplication. The UE then associates two duplicated sidelink logical channels corresponding to the same PDCP entity respectively with the two sets of carriers configured for the Destination of the two sidelink logical channels. The association between the duplicated sidelink logical channel and the carrier set is up to UE implementation. Data of a duplicated sidelink logical channel can only be transmitted on the carrier(s) in the associated carrier set.

For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively as specified in 3GPP TS 36.321 [13].

3GPP TS 36.321 v15.2.0 discloses the following:
6.2.4 MAC header for SL-SCH
The MAC header is of variable size and consists of the following fields:
- V: The MAC PDU format version number field indicates which version of the SL-SCH subheader is used. In this version of the specification three format versions are defined, and this field shall therefore be set to "0001", "0010", and "0011". If the DST field is 24 bits this field shall be set to "0011". The V field size is 4 bits;
- SRC: The Source Layer-2 ID field carries the identity of the source. It is set to the ProSe UE ID. The SRC field size is 24 bits;
- DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers as defined in [14]. If the V field is set to "0001", this identifier is a groupcast identifier. If the V field is set to "0010", this identifier is a unicast identifier;
- LCID: The Logical Channel ID field uniquely identifies the logical channel instance within the scope of one Source Layer-2 ID and Destination Layer-2 ID pair of the corresponding MAC SDU or padding as described in table 6.2.4-1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The values of LCID from '01011' to '10100' identify the logical channels used to send duplicated RLC SDUs from logical channels of which the values of LCID from '00001' to '01010' respectively in sequential order. The LCID field size is 5 bits;
- L: The Length field indicates the length of the corresponding MAC SDU in bytes. There is one L field per MAC PDU subheader except for the last subheader. The size of the L field is indicated by the F field;
- F: The Format field indicates the size of the Length field as indicated in table 6.2.4-2. There is one F field per MAC PDU subheader except for the last subheader. The size of the F field is 1 bit. If the size of the MAC SDU is less than 128 bytes, the value of the F field is set to 0, otherwise it is set to 1;
- E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;
- R: Reserved bit, set to "0".

Figure 7:
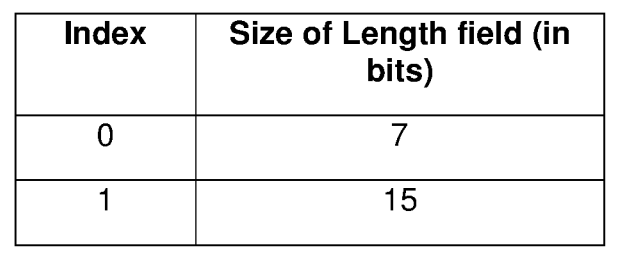

The MAC header and subheaders are octet aligned.
- FIG. 6 (a reproduction of Table 6.2.4-1 Values of LCID for SL-SCH)
- FIG. 7 (a reproduction of Table 6.2.4-2 Values of F field)

3GPP TS 36.323 v15.0.0 discloses the following:
5.1.2.1.4 Procedures for DRBs mapped on RLC AM, for LWA bearers and SLRB when the reordering function is used
For DRBs mapped on RLC AM and for LWA bearers, the PDCP entity shall use the reordering function as specified in this section when:
   the PDCP entity is associated with two AM RLC entities; or
   the PDCP entity is configured for a LWA bearer; or
   the PDCP entity is associated with one AM RLC entity after it was, according to the most recent reconfiguration, associated with two AM RLC entities or configured for a LWA bearer without performing PDCP re-establishment.
For SLRBs mapped on RLC UM, the PDCP entity shall use the reordering function as specified in this section when:
   the PDCP entity is associated with two sidelink UM RLC entities;
The PDCP entity shall not use the reordering function in other cases.
5.1.2.1.4.1 Procedures when a PDCP PDU is Received from the Lower Layers
For DRBs mapped on RLC AM, SLRB for duplicated transmission and for LWA bearers, when the reordering function is used, at reception of a PDCP Data PDU from lower layers, the UE shall:
   if received PDCP SN−Last_Submitted_PDCP_RX_SN>Reordering_Window or 0<=Last_Submitted_PDCP_RX_SN−received PDCP SN<Reordering_Window:
      if the PDCP PDU was received on WLAN:
         if received PDCP SN>Next_PDCP_RX_SN:
            for the purpose of setting the HRW field in the LWA status report, use COUNT based on RX_HFN−1 and the received PDCP SN;
         else:
            for the purpose of setting the HRW field in the LWA status report, use COUNT based on RX_HFN and the received PDCP SN;
      discard the PDCP PDU;
   else if Next_PDCP_RX_SN−received PDCP SN>Reordering_Window:
      increment RX_HFN by one;
      use COUNT based on RX_HFN and the received PDCP SN for deciphering the PDCP PDU;
      set Next_PDCP_RX_SN to the received PDCP SN+1;
   else if received PDCP SN−Next_PDCP_RX_SN>=Reordering_Window:
      use COUNT based on RX_HFN−1 and the received PDCP SN for deciphering the PDCP PDU;
   else if received PDCP SN>=Next_PDCP_RX_SN:
      use COUNT based on RX_HFN and the received PDCP SN for deciphering the PDCP PDU;
      set Next_PDCP_RX_SN to the received PDCP SN+1;
      if Next_PDCP_RX_SN is larger than Maximum_PDCP_SN:
         set Next_PDCP_RX_SN to 0;
         increment RX_HFN by one;
   else if received PDCP SN<Next_PDCP_RX_SN:
      use COUNT based on RX_HFN and the received PDCP SN for deciphering the PDCP PDU;
   if the PDCP PDU has not been discarded in the above:
      if a PDCP SDU with the same PDCP SN is stored:
         discard the PDCP PDU;
      else:
         perform deciphering of the PDCP PDU and store the resulting PDCP SDU;
      if received PDCP SN=Last_Submitted_PDCP_RX_SN+1 or received PDCP SN=Last_Submitted_PDCP_RX_SN−Maximum_PDCP_SN:
         deliver to upper layers in ascending order of the associated COUNT value:

all stored PDCP SDU(s) with consecutively associated COUNT value(s) starting from the COUNT value associated with the received PDCP PDU;
set Last_Submitted_PDCP_RX_SN to the PDCP SN of the last PDCP SDU delivered to upper layers;
if t-Reordering is running:
if the PDCP SDU with Reordering_PDCP_RX_COUNT−1 has been delivered to upper layers:
stop and reset t-Reordering;
if t-Reordering is not running (includes the case when t-Reordering is stopped due to actions above):
if there is at least one stored PDCP SDU:
start t-Reordering;
set Reordering_PDCP_RX_COUNT to the COUNT value associated to RX_HFN and Next_PDCP_RX_SN.

. . .

5.1.3 SL Data Transmission Procedures

For Sidelink transmission, the UE shall follow the procedures in subclause 5.1.1 with following modifications:
the requirements for maintaining Next_PDCP_TX_SN and TX_HFN are not applicable;
determine a PDCP SN ensuring that a PDCP SN value is not reused with the same key;
perform ciphering (if configured) as specified in subclause 5.6.1 and 5.6.2;
perform the header compression (if configured) if SDU Type is set to 000, i.e. IP SDUs.

For sidelink duplication transmission capable UE, when PDCP duplication transmission is configured, for the SLRB with packets which have PPPR no lower than the configured PPPR threshold, the Sidelink transmission of UE shall follow the procedures in subclause 5.1.1 with following modifications compared to above Sidelink transmission procedure:
the requirements for maintaining Next_PDCP_TX_SN and TX_HFN are applicable;
the PDCP entity duplicates the PDCP PDUs, and delivers the PDCP PDUs to both RLC entities for transmission.

5.1.4 SL Data Reception Procedures

For Sidelink reception, the UE shall follow the procedures in subclause 5.1.2.1.3 with following modifications:
the requirements for maintaining Next_PDCP_RX_SN and RX_HFN are not applicable;
perform the deciphering (if configured) as specified in subclause 5.6.1 and 5.6.2;
perform the header decompression (if configured) if SDU Type is set to 000, i.e. IP SDUs.

For sidelink duplication reception capable UE, if it detects PDCP duplication reception in duplication logical channel, or if it receives a PDCP SN which is not "0" from the non-duplication logical channel, the Sidelink reception of the UE shall follow the procedures in subclause 5.1.2.1.4.1 with following modifications compared to above Sidelink reception procedure:
the requirements for maintaining Next_PDCP_RX_SN and RX_HFN are applicable;
perform the re-ordering procedure as specified in subclause 5.1.2.1.4.1.

. . .

5.6.1 SL Ciphering and Deciphering for one-to-many communication

For SLRB used for one-to-many communication, the ciphering function includes both ciphering and deciphering and is performed in PDCP as defined in [13]. The data unit that is ciphered is the data part of the PDCP PDU (see subclause 6.3.3). The ciphering function as specified in [6] is applied with KEY (PEK), COUNT (derived from PTK Identity and PDCP SN as specified in [13]), BEARER and DIRECTION (set to 0) as input. The ciphering function is configured by ProSe Function.

If ciphering is configured, the ciphering algorithm and related parameters including PGK, PGK Identity, and Group Member Identity are configured to the UE by ProSe Key Management Function. The UE shall set PTK Identity based on PGK, PGK Identity, and PDCP SN as specified in [13]. The UE shall derive PTK from PGK using PTK Identity and Group Member Identity, and derive PEK from PTK using the ciphering algorithm. The PGK Index, PTK Identity, and PDCP SN are included in the PDCP PDU header.

If ciphering is not configured, PGK Index and PTK Identity shall be set to "0" in the PDCP PDU header.

If ciphering is not configured, and sidelink duplication transmission is disabled for the SLRB, PDCP SN shall be set to "0" in the PDCP PDU header.

5.6.2 SL Ciphering and Deciphering for one-to-one communication

For SLRB used for one-to-one communication, the ciphering function includes both ciphering and deciphering and is performed in PDCP of SLRB that needs ciphering and deciphering as defined in [13]. The data unit that is ciphered is the data part of the PDCP PDU (see subclause 6.3.3). The ciphering function as specified in [6] is applied with KEY (PEK), COUNT (derived from $K_{D\text{-}sess}$ Identity and PDCP SN as specified in [13]), BEARER and DIRECTION (which value shall be set is specified in [13]) as input.

For the SLRB that needs ciphering and deciphering, the UE shall derive the KEY (PEK) based on $K_{D\text{-}sess}$ and the algorithms determined by the initiating UE and the receiving UE as specified in [13]. The $K_{D\text{-}sess}$ Identity and PDCP SN are included in the PDCP PDU header.

For the SLRB that does not need ciphering and deciphering, the UE shall set $K_{D\text{-}sess}$ Identity to "0" in the PDCP PDU header.

For the SLRB that does not need ciphering and deciphering, and sidelink duplication transmission is disabled, PDCP SN shall be set "0" in the PDCP PDU header.

. . .

b) t-Reordering

The duration of the timer is configured by upper layers [3] except for the case of SL PDCP duplication reception. For SL PDCP duplication transmission, the t-Reordering timer is generated by the UE. This timer is used to detect loss of PDCP PDUs as specified in the subclause 5.1.2.1.4. If t-Reordering is running, t-Reordering shall not be started additionally, i.e. only one t-Reordering per PDCP entity is running at a given time.

. . .

7.1 State Variables

This sub clause describes the state variables used in PDCP entities in order to specify the PDCP protocol.

All state variables are non-negative integers.

The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN

The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0.

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

The variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

f) Reordering_PDCP_RX_COUNT

This variable is used only when the reordering function is used. This variable holds the value of the COUNT following the COUNT value associated with the PDCP PDU which triggered t-Reordering.

7.2 Timers

The transmitting side of each PDCP entity for DRBs shall maintain the following timers:

a) discardTimer

The duration of the timer is configured by upper layers [3]. In the transmitter, a new timer is started upon reception of an SDU from upper layer.

The receiving side of each PDCP entity shall maintain the following timers only when the reordering function is used:

b) t-Reordering

The duration of the timer is configured by upper layers [3] except for the case of SL PDCP duplication reception. For SL PDCP duplication transmission, the t-Reordering timer is generated by the UE. This timer is used to detect loss of PDCP PDUs as specified in the subclause 5.1.2.1.4. If t-Reordering is running, t-Reordering shall not be started additionally, i.e. only one t-Reordering per PDCP entity is running at a given time.

The receiving side of each PDCP entity associated with LWA bearers shall maintain the following timers:

c) t-StatusReportType1

The duration of the timer is configured by upper layers (statusPDU-Periodicity-Type1 [3]). This timer is used to trigger status report transmission for LWA as specified in the subclause 5.10.

d) t-StatusReportType2

The duration of the timer is configured by upper layers (statusPDU-Periodicity-Type2 and statusPDU-Periodicity-Offset [3]). If statusPDU-Periodicity-Offset is configured and it is the first run of the timer after (re)configuration, the duration of the timer is the sum of statusPDU-Periodicity-Type2 and statusPDU-Periodicity-Offset [3], otherwise the duration of the timer is statusPDU-Periodicity-Type2. When configured, this timer is used to trigger status report transmission for LWA as specified in the subclause 5.10.

7.3 Constants a) Reordering_Window

Indicates the size of the reordering window. The size equals to 16 when a 5 bit SN length is used, 64 when a 7 bit SN length is used, 2048 when a 12 bit SN length is used, 16384 when a 15 bit SN length is used, 32768 when a 16 bit SN length is used, or 131072 when 18 bit SN length is used, i.e. half of the PDCP SN space, for radio bearers that are mapped on RLC AM and for LWA bearers.

b) Maximum_PDCP_SN is:

262143 if the PDCP entity is configured for the use of 18 bits SNs 65535 if the PDCP entity is configured for the use of 16 bits SNs 32767 if the PDCP entity is configured for the use of 15 bits SNs 4095 if the PDCP entity is configured for the use of 12 bit SNs 127 if the PDCP entity is configured for the use of 7 bit SNs 31 if the PDCP entity is configured for the use of 5 bit SNs 3GPP R2-1812809 discloses the following:

To enhance the reliability and reduce the latency, the PDCP duplication for V2X is introduced in Rel-15. For PDCP duplication, a transmitting PDCP entity mapped with SLRB duplicates the PDCP PDU and transmits same PDCP PDU to the different RLC entities, and a receiving PDCP entity mapped with SLRB performs the PDCP reordering function. For this reason, the transmitting PDCP entity and receiving PDCP entity maintain the state variables.

Generally, in V2X, if the transmitting UE broadcasts the packets for a specific service, a receiving UE receives the broadcasted packet which could be for the beginning part or the middle part of the specific service. In other words, a receiving PDCP entity may receive the first received PDCP PDU located outside of the PDCP reordering window.

For instance, when a receiving PDCP entity receives a first received PDCP PDU associated with PDCP SN 40000, the receiving PDCP entity discards the PDCP PDU due to outside of the PDCP reordering window. After that, the PDCP PDUs received after receiving PDCP PDU associated with PDCP SN 40000 are discarded until receiving a PDCP PDU located within the PDCP reordering window.

This is because when the receiving PDCP entity is established, the range of the PDCP reordering window is from 0 to 32767. Moreover, in PDCP reordering procedure, the receiving PDCP entity updates the lower edge of the PDCP reordering window only when a PDCP SDU is delivered to the upper layer.

In addition, even if the first received PDCP PDU is located in the range of the PDCP reordering window, the receiving PDCP entity may store the PDCP PDU until the t-Reordering expires.

Observation. For PDCP Duplication, the Receiving PDCP Entity May Discard the First Received PDCP PDU Due to Outside of the PDCP Reordering Window.

To handle this issue, the straightforward solution is that the lower edge of the PDCP reordering window is updated when the receiving PDCP entity receives the first received PDCP PDU from the lower layer.

However, in 36.323 v15.0.0, the transmitting PDCP entity assigns the PDCP SN for the PDCP PDU except PDCP SN 0 if the PPPR of the PDCP SDU is higher than PPPR threshold. Otherwise, the transmitting PDCP entity always assigns the PDCP SN 0 for the PDCP PDU. It means that that the PDCP PDU associated with PDCP SN 0 should not be reordered in the PDCP reordering window. Consequently, the receiving PDCP entity can receive the PDCP PDU associated with PDCP SN 0 as the first received PDCP PDU. To above this case, the receiving PDCP entity should update the lower edge of the PDCP reordering window is updated only when the receiving PDCP entity receives the first received PDCP PDU not associated with PDCP SN 0.

In 36.323 v15.0.0, the lower edge of the PDCP reordering window sets up based on Last_Submitted_PDCP_RX_SN. Therefore, when the receiving PDCP entity receives a PDCP PDU which is the first received PDCP PDU not associated with the PDCP SN 0, Last_Submitted_PDCP_RX_SN should be updated to the PDCP SN of the PDCP PDU.

Proposal. When the Receiving PDCP Entity Receives a PDCP PDU which is the First Received PDCP PDU not Associated with the PDCP SN 0, the Receiving PDCP Entity Updates the Last_Submitted_PDCP_RX_SN to the PDCP SN of the first received PDCP PDU.

According to 3GPP TS36.300 v15.2.0, Carrier Aggregation (CA) in Sidelink is supported for Cellular Vehicle-to-Everything (V2X) sidelink communication and CA in sidelink applies to both in coverage UEs and out of coverage UEs. In addition, sidelink packet duplication will be supported for V2X sidelink communication and may be performed at the Packet Data Convergence Protocol (PDCP) layer of the UE. For sidelink packet duplication for transmission, a PDCP Protocol Data Unit (PDU) is duplicated at the PDCP entity. The duplicated PDCP PDUs of the same PDCP entity are submitted/delivered to two different Radio Link Control (RLC) entities and associated with two different sidelink logical channels, respectively. The duplicated PDCP PDUs of the same PDCP entity are only allowed to be transmitted on different sidelink carriers. A UE can activate or deactivate sidelink packet duplication based on a preconfiguration or configuration. The ProSe Per-Packet Reliability (PPPR) value(s) for which sidelink packet duplication is supported can be preconfigured or configured via a PPPR threshold. For UE autonomous resource selection and scheduled resource allocation, the UE shall perform a sidelink packet duplication for the data with the configured PPPR value(s) until packet duplication is de-configured for these PPPR value(s). For a scheduled resource allocation, the UE reports the amount of data associated with one or more PPPR values and the destination(s) to which the data belongs via sidelink Buffer Status Report(s) (BSR(s)). A mapping of the PPPR values to logical channel groups can be configured by the evolved Node B (eNB), and the PPPR value(s) are reflected by the associated logical channel group ID included in the sidelink BSR(s). A list of PPPR value(s) may be reported in a Sidelink UE information by an RRC_CONNECTED UE. For a UE using a scheduled resource allocation, two non-overlapped sets of carriers are configured by the eNB per the destination reported by the UE to the network, and they apply to all the PPPR(s) that are configured for sidelink packet duplication. The UE then associates two duplicated sidelink logical channels corresponding to the same PDCP entity, respectively, with the two sets of carriers configured for the destination of the two sidelink logical channels. The destination could be an identity corresponding to one or more than one (receiving) UEs to which the (transmitting) UE performs a sidelink communication transmission. The association between the duplicated sidelink logical channel and the carrier set is based on UE implementation. Data of a duplicated sidelink logical channel can only be transmitted on the carrier(s) in the associated carrier set.

Figure 8:
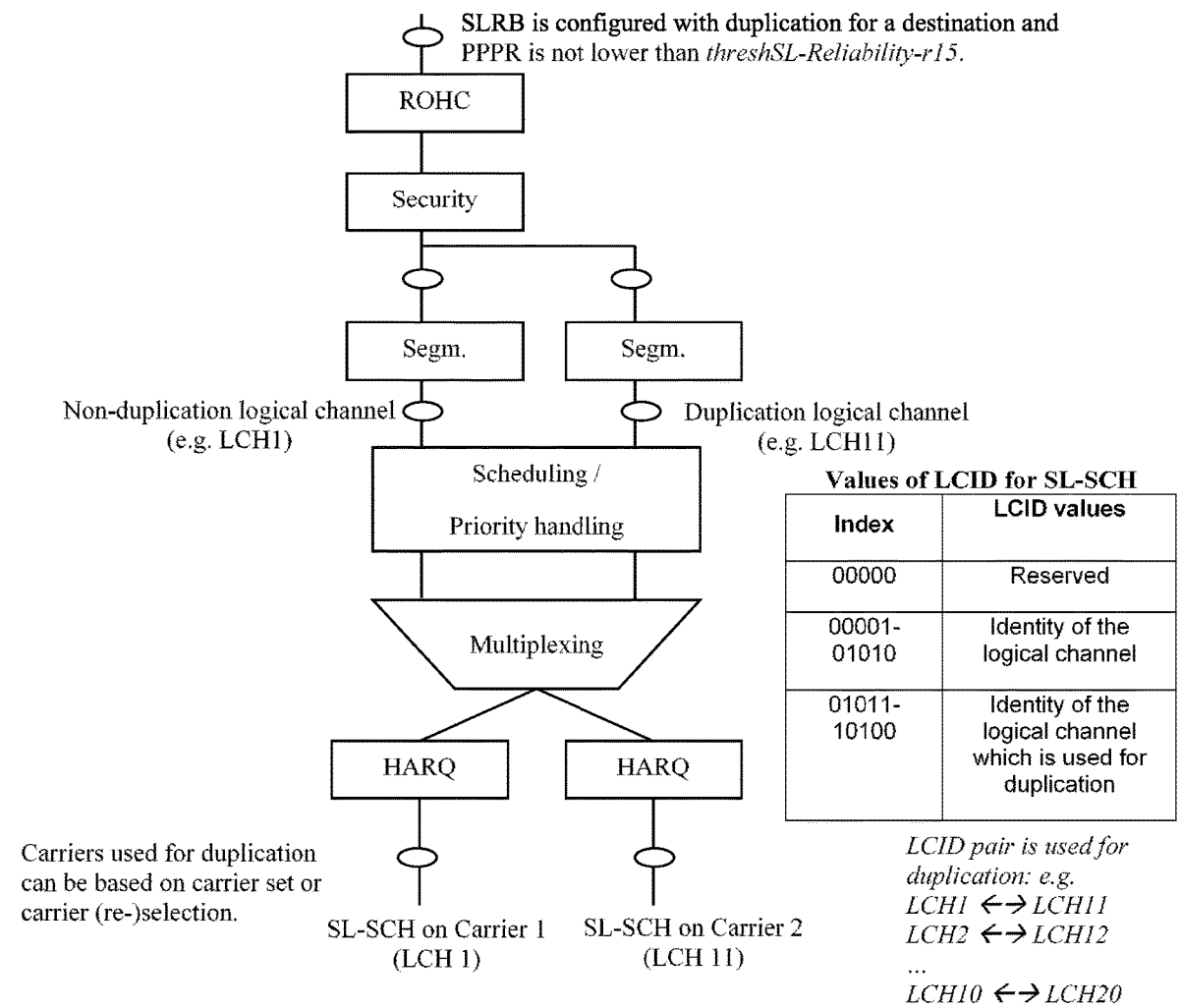
FIG. 8 illustrates an exemplary embodiment of transmission operations for sidelink packet duplication.

FIG. 8 illustrates an example of transmission operation for sidelink packet duplication.

A (transmitting) UE may have data available for transmission (to a destination) on a sidelink radio bearer (SLRB). The SLRB could be associated with a reliability value (e.g., PPPR). The reliability value may be lower than a threshold value. The UE may perform sidelink packet duplication on the SLRB. The UE could duplicate a PDCP PDU. The UE could deliver the PDCP PDU and the duplicate of the PDCP PDU into two different RLC entities/layers associated with the SLRB. The UE could deliver the PDCP PDU into a first Radio Link Control (RLC) entity/layer associated with the SLRB. The UE could deliver the duplicate of the PDCP PDU into a second RLC entity/layer associated with the SLRB. The UE may be configured with a sidelink packet duplication on the SLRB. The UE could maintain state variable(s) or parameter(s) used for a sidelink transmission on the SLRB. The state variable or parameter could be Next_PDCP_TX_SN. The state variable or parameter could be TX_HFN. For the sidelink packet duplication, the UE may select a non-duplication logical channel from a first range (e.g., LCH1 to LCH10, '00001' to '01010', or like). For the sidelink packet duplication, the UE may select a duplication logical channel from a second range (e.g., LCH11 to LCH20, '01011' to '10100', or the like). The values of the first range may identify the logical channels used to send duplicated RLC Service Data Units (SDUs) from the logical channels of which the values of the second range, respectively, in sequential order. In this example, the UE may use a first logical channel (e.g., LCH1) and a second logical channel (e.g., LCH11) for the sidelink packet duplication. The UE may use a first carrier (e.g., Carrier 1) to serve the first logical channel. The UE may use a second carrier (e.g., Carrier 2) to serve the second logical channel.

Figure 9:
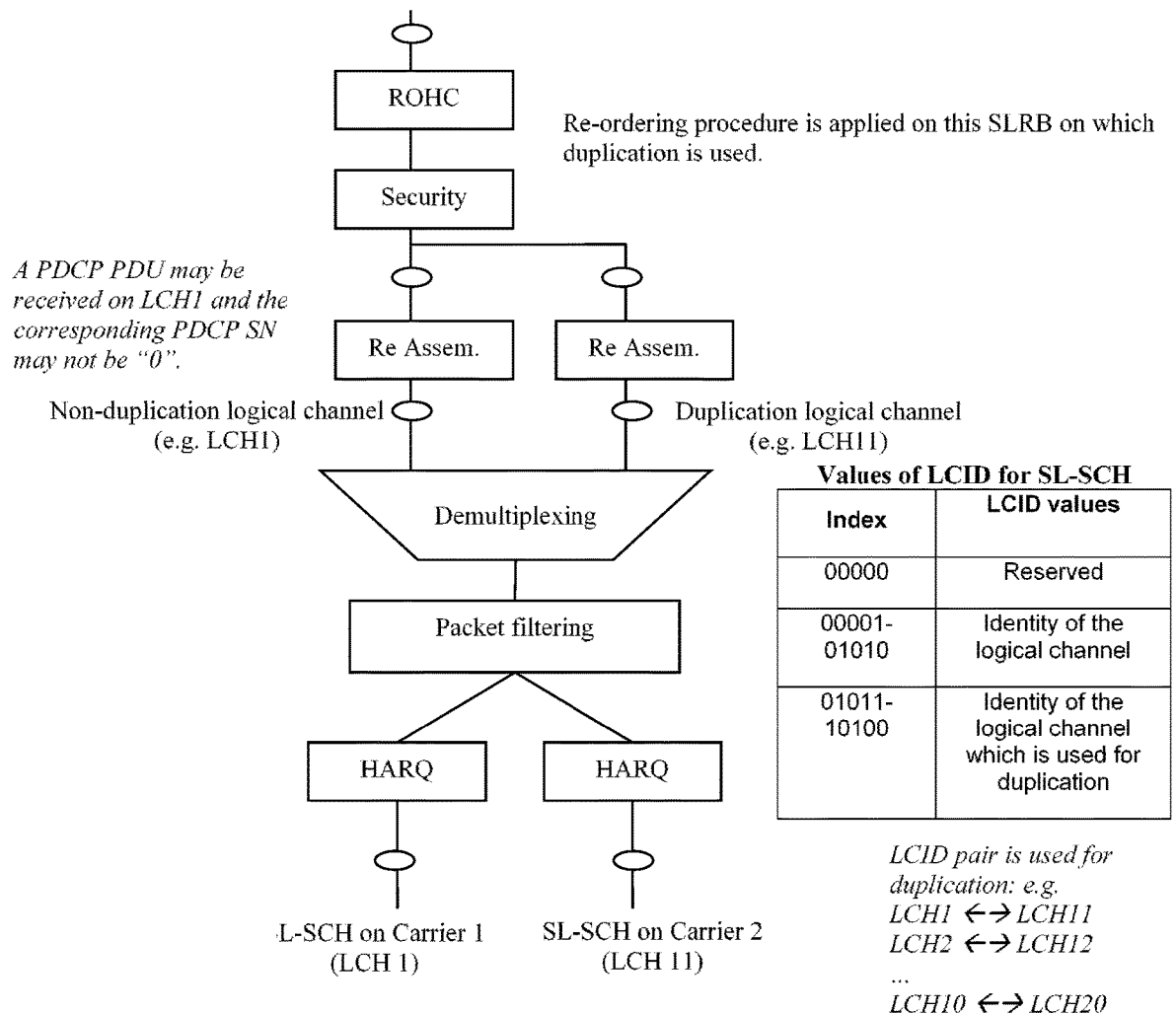
FIG. 9 illustrates an exemplary embodiment of reception operations for sidelink packet duplication.

FIG. 9 illustrates an example of reception operation for sidelink packet duplication.

According to 3GPP R2-1812809, if a transmitting UE broadcasts packets for a specific service (e.g., V2X), a receiving UE could receive the broadcasted packets which could be for the beginning part or the middle part of the specific service. Based on 3GPP TS36.323 v.15.0.0, when a receiving PDCP entity is established, the range of a re-ordering window is from 0 to 32767. Moreover, in a re-ordering procedure, the receiving PDCP entity updates the lower edge of the re-ordering window only when a PDCP SDU is delivered to the upper layer. In case the receiving UE starts to receive the broadcasted packets in the middle of the specific service session, the first received PDCP PDU will be discarded in the re-ordering procedure if the PDCP Sequence Number (SN) of the first received PDCP PDU is out of the re-ordering window of the re-ordering procedure. And the PDCP PDUs following the first received PDCP PDU will be also discarded until receiving a PDCP PDU with a PDCP SN within the re-ordering window. On the other hand, if the PDCP SN of the first received PDCP PDU is located in the re-ordering window, the receiving UE will store the resulting PDCP SDU of this first received PDCP PDU until the t-Reordering timer expires. This situation could cause delivery latency for the specific service. Therefore, a concept of a solution to solve above issue was proposed in 3GPP R2-1812809 is that the receiving UE could update the lower edge of the re-ordering window to the PDCP SN of the first received PDCP PDU, i.e., Last_Submitted_PDCP_RX_SN is set to a PDCP SN of the first received PDCP PDU. In this situation, if the receiving UE follows the current PDCP specification as disclosed in 3GPP TS36.323 v15.0.0, the receiving UE will discard the first received PDCP PDU because this PDCP PDU is still out of the re-ordering window. For example, the PDCP SN of the first received PDCP PDU is 4000, and the Last_Submitted_PDCP_RX_SN is set to 4000 based on the concept in 3GPP R2-1812809. In this situation, the condition "0<=Last_Submitted_PDCP_RX_SN (i.e. 4000)−received PDCP SN (i.e. 4000)<Reordering_Window (i.e. 32768)" in the re-ordering procedure is satisfied. As a result, the receiving UE still discards this first received PDCP PDU. To avoid discarding the first received PDCP PDU incorrectly, two different directions could be considered. The first direction is the first received PDCP PDU goes through the re-ordering procedure, and the second direction is the first received PDCP PDU does not go through the re-ordering procedure.

Direction 1: if a first PDCP PDU is received on a logical channel associated with a SLRB and a PDCP SN of the first PDCP PDU is not equal to 0, the receiving UE sets a first state variable Last_Submitted_PDCP_RX_SN to a value which is less than the PDCP SN of the first PDCP PDU. In principle, the first state variable Last_Submitted_PDCP_RX_SN should be properly set such that the PDCP SN of the first PDCP PDU is within the reordering window of the re-ordering procedure. In other words, the first state variable Last_Submitted_PDCP_RX_SN should be greater than or equal to the Reordering_Window+the PDCP SN of the first PDCP PDU if the PDCP SN of the first PDCP PDU is less than the Reordering_Window, or the first state variable Last_Submitted_PDCP_RX_SN should be greater than or equal to the PDCP SN of the first PDCP PDU–the Reordering_Window if the PDCP SN of the first PDCP PDU is greater than or equal to the Reordering_Window. In one scenario, the first state variable Last_Submitted_PDCP_RX_SN could be set to the PDCP SN of the first PDCP PDU−1. If the PDCP SN of the first PDCP PDU is equal to 0, the first state variable Last_Submitted_PDCP_RX_SN could be set to the Maximum_PDCP_SN or set to a value less than the Maximum_PDCP_SN and greater than or equal to Reordering_Window (considering sequence numbers wrap around). The receiving UE could then perform a re-ordering procedure for the first PDCP PDU using the first state variable Last_Submitted_PDCP_RX_SN set above. The PDCP SDU of the first PDCP PDU will then be delivered to the upper layer(s) in the re-ordering procedure.

In another scenario, following the above-disclosed example, the Last_Submitted_PDCP_RX_SN could be set to 3999 (=4000−1) (if/when the first PDCP PDU is received).

In another scenario, when receiving the first PDCP PDU, the receiving UE could further set a second state variable Next_PDCP_RX_SN to a value which is greater than or equal to the SN of the first PDCP PDU, and the receiving UE could perform the re-ordering procedure for the first PDCP PDU using the first state variable Last_Submitted_PDCP_RX_SN and the second state variable Next_PDCP_RX_SN (set above).

Direction 2: if a first PDCP PDU is received on a logical channel associated with a SLRB and a PDCP SN of the first PDCP PDU is not equal to 0, the receiving UE sets a first state variable Last_Submitted_PDCP_RX_SN to the PDCP SN of the first PDCP PDU. In one scenario, the receiving UE could deliver a PDCP SDU of the first PDCP PDU to the upper layer(s). In another scenario, the receiving UE could set the first state variable Last_Submitted_PDCP_RX_SN to the PDCP SN of the first PDCP PDU after delivering the PDCP SDU to the upper layer(s). The receiving UE could then perform a re-ordering procedure for PDCP PDUs received after the first PDCP PDU using the first state variable Last_Submitted_PDCP_RX_SN as set above. Basically, the receiving UE does not perform the re-ordering procedure for the first PDCP PDU (using the first state variable Last_Submitted_PDCP_RX_SN).

In another embodiment, following the above-disclosed example, the Last_Submitted_PDCP_RX_SN could be set to 4000.

In another embodiment, when receiving the first PDCP PDU, the receiving UE could further set a second state variable Next_PDCP_RX_SN to a value which is greater than or equal to the PDCP SN of the first PDCP PDU+1. If the PDCP SN of the first PDCP PDU is equal to or close to the Maximum_PDCP_SN, the second state variable Next_PDCP_RX_SN could be set to 0 or set to a value greater than 0 (considering sequence numbers wrap around). The receiving UE could perform the re-ordering procedure for the PDCP PDUs received after the first PDCP PDU using the first state variable Last_Submitted_PDCP_RX_SN and the second state variable Next_PDCP_RX_SN.

The following could apply to the solutions in both above-disclosed directions.

In one embodiment, when receiving the first PDCP PDU, the receiving UE could set a third state variable RX_HFN to initial value (e.g., 0) for the re-ordering procedure.

In one embodiment, the UE could detect that the sidelink duplication is configured or enabled for the SLRB upon the reception of the first PDCP PDU with the PDCP SN not equal to 0.

In one embodiment, the logical channel could be either a duplication logical channel or a non-duplication logical channel.

Since it is possible that the transmitting UE could have transmitted some PDCP PDU(s) before a PDCP PDU, which is the first received PDCP PDU on the receiving UE, is transmitted by the transmitting UE, it is possible that the receiving UE could still receive some PDCP PDU(s) after reception of the first received PDCP PDU. Since the specific service (e.g., V2X) could be critical, missing the some PDCP PDU(s) would not be desirable. To solve this issue, there are two possible directions.

Direction 1: the receiving UE could initialize a first state variable Last_Submitted_PDCP_RX_SN based on a PDCP SN of the first received PDCP PDU and a partial Reordering_Window (less than the Reordering_Window), or based on a PDCP SN of the first received PDCP PDU and a partial PDCP SN space (less than half of the PDCP SN space). The receiving UE could set a second state variable Next_PDCP_RX_SN based on the initialized first state variable Last_Submitted_PDCP_RX_SN or the PDCP SN of the first received PDCP PDU. The second state variable Next_PDCP_RX_SN could be set to the initialized first state variable Last_Submitted_PDCP_RX_SN shifted by the Reordering_Window (e.g. the Next_PDCP_RX_SN=[the initialized first state variable Last_Submitted_PDCP_RX_SN+the Reordering_Window] or the Next_PDCP_RX_SN=[the initialized first state variable Last_Submitted_PDCP_RX_SN–the Reordering_Window]). The second state variable Next_PDCP_RX_SN could be set to [the PDCP SN of the first received PDCP PDU+1].

In one embodiment, the partial Reordering_Window could be a ½, ¼, ⅛, 1/16, 1/32, 1/64, 1/128, 1/256, 1/512, 1/1024, 1/2048, or 1/4096 Reordering_Window. A (complete) Reordering_Window could be 32768.

In one embodiment, the partial PDCP SN space could be a ¼, ⅛, 1/16, 1/32, 1/64, 1/128, 1/256, 1/512, 1/1024, 1/2048, 1/4096, or 1/8192 PDCP SN space. A (complete) PDCP SN space could be 65536.

In one embodiment, the receiving UE could initialize the first state variable Last_Submitted_PDCP_RX_SN to [the PDCP SN of the first received PDCP PDU+the Reordering_Window+the partial Reordering_Window] if the PDCP SN of the first received PDCP PDU<the partial Reordering_Window if/when the first received PDCP PDU is received.

In one embodiment, the receiving UE could initialize the first state variable Last_Submitted_PDCP_RX_SN to [the PDCP SN of the first received PDCP PDU–the partial Reordering_Window] if the PDCP SN of the first received PDCP PDU>=the partial Reordering_Window if/when the first received PDCP PDU is received.

In one embodiment, the receiving UE could initialize the first state variable Last_Submitted_PDCP_RX_SN to [the PDCP SN of the first received PDCP PDU+a half of the PDCP SN space+the partial PDCP SN space] if the PDCP SN of the first received PDCP PDU<the partial PDCP SN space if/when the first received PDCP PDU is received.

In one embodiment, the receiving UE could initialize the first state variable Last_Submitted_PDCP_RX_SN to [the PDCP SN of the first received PDCP PDU–the partial PDCP SN space] if the PDCP SN of the first received PDCP PDU>=the partial PDCP SN space if/when the first received PDCP PDU is received.

Direction 2: the receiving UE could initialize a first state variable Last_Submitted_PDCP_RX_SN based on a partial Reordering_Window (less than the Reordering_Window) or a partial PDCP SN space (less than half of the PDCP SN space). The receiving UE could set a second state variable Next_PDCP_RX_SN based on the initialized first state variable Last_Submitted_PDCP_RX_SN or the PDCP SN of the first received PDCP PDU. The second state variable Next_PDCP_RX_SN could be set to the initialized first state variable Last_Submitted_PDCP_RX_SN shifted by the Reordering_Window (e.g., the Next_PDCP_RX_SN=[the initialized first state variable Last_Submitted_PDCP_RX_SN+the Reordering_Window] or the Next_PDCP_RX_SN=[the initialized first state variable Last_Submitted_PDCP_RX_SN–the Reordering_Window]). The second state variable Next_PDCP_RX_SN could be set to [the PDCP SN of the first received PDCP PDU+1].

In one embodiment, the partial Reordering_Window could be a ½, ¼, ⅛, 1/16, 1/32, 1/64, 1/128, 1/256, 1/512, 1/1024, 1/2048, or 1/4096 Reordering_Window. A (complete) Reordering_Window could be 32768.

In one embodiment, the partial PDCP SN space could be a ¼, ⅛, 1/16, 1/32, 1/64, 1/128, 1/256, 1/512, 1/1024, 1/2048, 1/4096, or 1/8192 PDCP SN space. A (complete) PDCP SN space could be 65536.

In one embodiment, the receiving UE could initialize the first state variable Last_Submitted_PDCP_RX_SN to [the PDCP SN of the first received PDCP PDU+the Reordering_Window+the partial Reordering_Window] if the PDCP SN of the first received PDCP PDU<the partial Reordering_Window at the establishment of a PDCP entity (used to handle the first received PDCP PDU).

In one embodiment, the receiving UE could initialize the first state variable Last_Submitted_PDCP_RX_SN to [the PDCP SN of the first received PDCP PDU–the partial Reordering_Window] if the PDCP SN of the first received PDCP PDU>=the partial Reordering_Window at the establishment of a PDCP entity (used to handle the first received PDCP PDU).

In one embodiment, the receiving UE could initialize the first state variable Last_Submitted_PDCP_RX_SN to [the PDCP SN of the first received PDCP PDU+a half of the PDCP SN space+the partial PDCP SN space] if the PDCP SN of the first received PDCP PDU<the partial PDCP SN space at the establishment of a PDCP entity (used to handle the first received PDCP PDU).

In one embodiment, the receiving UE could initialize the first state variable Last_Submitted_PDCP_RX_SN to [the PDCP SN of the first received PDCP PDU–the partial PDCP SN space] if the PDCP SN of the first received PDCP PDU>=the partial PDCP SN space at the establishment of a PDCP entity (used to handle the first received PDCP PDU).

The following could apply to solutions in both directions mentioned above.

In one embodiment, when receiving the first PDCP PDU, the receiving UE could set a third state variable RX_HFN to an initial value (e.g. 0) for the re-ordering procedure.

In one embodiment, the UE could detect that a sidelink duplication is configured or enabled for the SLRB upon the reception of the first PDCP PDU with PDCP SN not equal to 0.

In one embodiment, the logical channel could be either a duplication logical channel or a non-duplication logical channel.

In one embodiment, the receiving UE could start a re-ordering timer (in the re-ordering procedure) if/when the first received PDCP PDU is received. The receiving UE could set a third variable Reordering_PDCP_RX_COUNT based on the second variable Next_PDCP_RX_SN. The third variable Reordering_PDCP_RX_COUNT could hold a received PDCP SN of a PDCP PDU which triggered the re-ordering timer. The third variable Reordering_PDCP_RX_COUNT could hold a value of the COUNT following the COUNT value associated with a PDCP PDU which triggered the re-ordering timer. The third variable Reordering_PDCP_RX_COUNT could be set to the second variable Next_PDCP_RX_SN. The third variable Reordering_PDCP_RX_COUNT could be set to a COUNT associated with the second variable Next_PDCP_RX_SN (and a RX_HFN). When the re-ordering timer expires, a PDCP SDU of the first received PDCP PDU could be delivered to the upper layer. The receiving UE could stop the re-ordering timer if/when a PDCP SDU of a received PDCP SN set to [the third variable Reordering_PDCP_RX_COUNT–1] is delivered to the upper layer. The receiving UE could stop the re-ordering timer if/when a PDCP SDU of the first received PDCP PDU is delivered to the upper layer.

Figure 10:
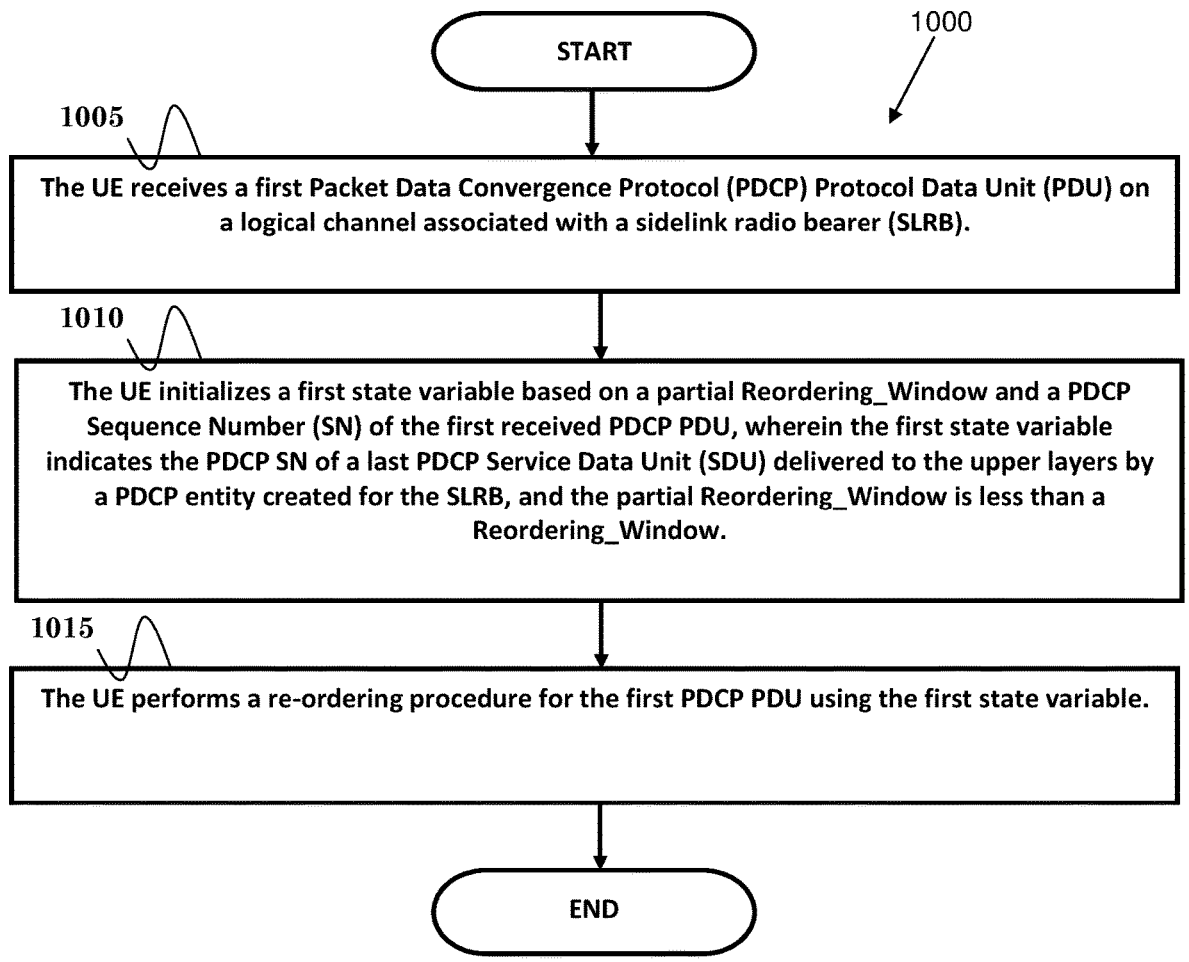
FIG. 10 is a flow diagram for one exemplary embodiment from the perspective of a User Equipment (UE).

FIG. 10 is a flow chart 1000 according to one exemplary embodiment from the perspective of a UE. In step 1005, the UE receives a first Packet Data Convergence Protocol (PDCP) Protocol Data Unit (PDU) on a logical channel associated with a sidelink radio bearer (SLRB). In step 1010, the UE initializes a first state variable based on a partial Reordering_Window and a PDCP Sequence Number (SN) of the first received PDCP PDU, wherein the first state variable indicates the PDCP SN of a last PDCP Service Data Unit (SDU) delivered to the upper layers by a PDCP entity created for the SLRB, and the partial Reordering_Window is less than a Reordering_Window. In step 1015, the UE performs a re-ordering procedure for the first PDCP PDU using the first state variable.

In another method, the first state variable is set to the PDCP SN of the first PDCP PDU–the partial Reordering_Window if the PDCP SN of the first PDCP PDU>=the partial Reordering_Window.

In another method, the first state variable is set to the PDCP SN of the first PDCP PDU+the Reordering_Window+the partial Reordering_Window if the PDCP SN of the first PDCP PDU<the partial Reordering_Window.

In another method, the partial Reordering_Window is the ½ Reordering_Window.

In another method, the Reordering_Window is a half of a PDCP SN space.

In another method, the specific value is zero or the smallest value among the derived metrics for the candidate resources.

In another method, the Reordering_Window is 32768.

In another method, the first state variable is Last_Submitted_PDCP_RX_SN.

In another method, the UE receives a second PDCP PDU on a logical channel associated with the SLRB.

In another method, the UE performs the re-ordering procedure for the second PDCP PDU to store a PDCP SDU of the second PDCP PDU or to deliver a PDCP SDU of the second PDCP PDU to upper layer(s), if a PDCP SN of the second PDCP PDU is larger than the first state variable.

As those skilled in the art will appreciate, the various disclosed embodiments may be combined to form new embodiments and/or methods.

Referring back to FIGS. 3 and 4, in one embodiment, the device 300 includes a program code 312 stored in memory 310. The CPU 308 could execute program code 312 to (i) receives a first PDCP PDU on a logical channel associated with a SLRB, (ii) initialize a first state variable based on a partial Reordering_Window and a PDCP SN of the first received PDCP PDU, wherein the first state variable indicates the PDCP SN of a last PDCP SDU delivered to the upper layers by a PDCP entity created for the SLRB, and the partial Reordering_Window is less than a Reordering_Window, and (iii) perform a re-ordering procedure for the first PDCP PDU using the first state variable.

Furthermore, the CPU 308 can execute the program code 312 to perform all of the above-described actions and steps or others methods described herein.

The above-disclosed methods avoid the incorrectly discarding the very first received PDCP PDU for sidelinks.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
   receiving a very first Packet Data Convergence Protocol (PDCP) Protocol Data Unit (PDU) on a logical channel associated with a sidelink radio bearer (SLRB);
   initializing a first state variable based on a partial Reordering_Window and a PDCP Sequence Number (SN) of the very first PDCP PDU, wherein the first state variable indicates the PDCP SN of a last PDCP Service Data Unit (SDU) delivered to the upper layers by a PDCP entity created for the SLRB, and the partial Reordering_Window is less than a Reordering_Window; and
   performing a re-ordering procedure for the very first PDCP PDU using the first state variable.

2. The method of claim 1, wherein the first state variable is set to the PDCP SN of the very first PDCP-PDU the partial Reordering_Window if the PDCP SN of the very first PDCP PDU>=the partial Reordering_Window.

3. The method of claim 1, wherein the first state variable is set to the PDCP SN of the very first PDCP PDU+the Reordering_Window+the partial Reordering_Window if the PDCP SN of the very first PDCP PDU<the partial Reordering_Window.

4. The method of claim 1, wherein the partial Reordering_Window is the ½ Reordering_Window.

5. The method of claim 1, wherein the Reordering_Window is a half of a PDCP SN space.

6. The method of claim 1, wherein the Reordering_Window is 32768.

7. The method of claim 1, wherein the first state variable is Last_Submitted_PDCP_RX_SN.

8. The method of claim 1, further comprising:
   receiving a second PDCP PDU on the logical channel associated with the sidelink radio bearer (SLRB).

9. The method of claim 8, further comprising:
   performing the re-ordering procedure for the second PDCP PDU to discard the second PDCP PDU if a PDCP SN of the second PDCP PDU is less than or equal to the first state variable.

10. The method of claim 8, further comprising:
    performing the re-ordering procedure for the second PDCP PDU to store a PDCP SDU of the second PDCP PDU or to deliver a PDCP SDU of the second PDCP PDU to upper layer(s), if a PDCP SN of the second PDCP PDU is larger than the first state variable.

11. A User Equipment (UE), the UE comprising:
    a control circuit;
    a processor installed in the control circuit; and
    a memory installed in the control circuit and coupled to the processor;
    wherein the processor is configured to execute a program code stored in the memory to:
      receive a very first Packet Data Convergence Protocol (PDCP) Protocol Data Unit (PDU) on a logical channel associated with a sidelink radio bearer (SLRB);
      initialize a first state variable based on a partial Reordering_Window and a PDCP Sequence Number (SN) of the very first PDCP PDU, wherein the first state variable indicates the PDCP SN of a last PDCP Service Data Unit (SDU) delivered to the upper layers by a PDCP entity created for the SLRB, and the partial Reordering_Window is less than a Reordering_Window; and
      perform a re-ordering procedure for the very first PDCP PDU using the first state variable.

12. The UE of claim 11, wherein the first state variable is set to the PDCP SN of the very first PDCP PDU the partial Reordering_Window if the PDCP SN of the very first PDCP PDU>=the partial Reordering_Window.

13. The UE of claim 11, wherein the first state variable is set to the PDCP SN of the very first PDCP PDU+the Reordering_Window+the partial Reordering_Window if the PDCP SN of the very first PDCP PDU<the partial Reordering_Window.

14. The UE of claim 11, wherein the partial Reordering_Window is the ½ Reordering_Window.

15. The UE of claim 11, wherein the Reordering_Window is a half of a PDCP SN space.

16. The UE of claim 11, wherein the Reordering_Window is 32768.

17. The method of claim 11, wherein the first state variable is Last_Submitted_PDCP_RX_SN.

18. The UE of claim 11, further comprising:
    receiving a second PDCP PDU on the logical channel associated with the sidelink radio bearer (SLRB).

19. The UE of claim 18, further comprising:
    performing the re-ordering procedure for the second PDCP PDU to discard the second PDCP PDU if a PDCP SN of the second PDCP PDU is less than or equal to the first state variable.

20. The UE of claim 18, further comprising:
    performing the re-ordering procedure for the second PDCP PDU to store a PDCP SDU of the second PDCP PDU or to deliver a PDCP SDU of the second PDCP PDU to upper layer(s), if a PDCP SN of the second PDCP PDU is larger than the first state variable.

* * * * *